March 17, 1931. A. LAGE 1,796,466
FEEDING RECEPTACLE
Filed Feb. 8, 1930
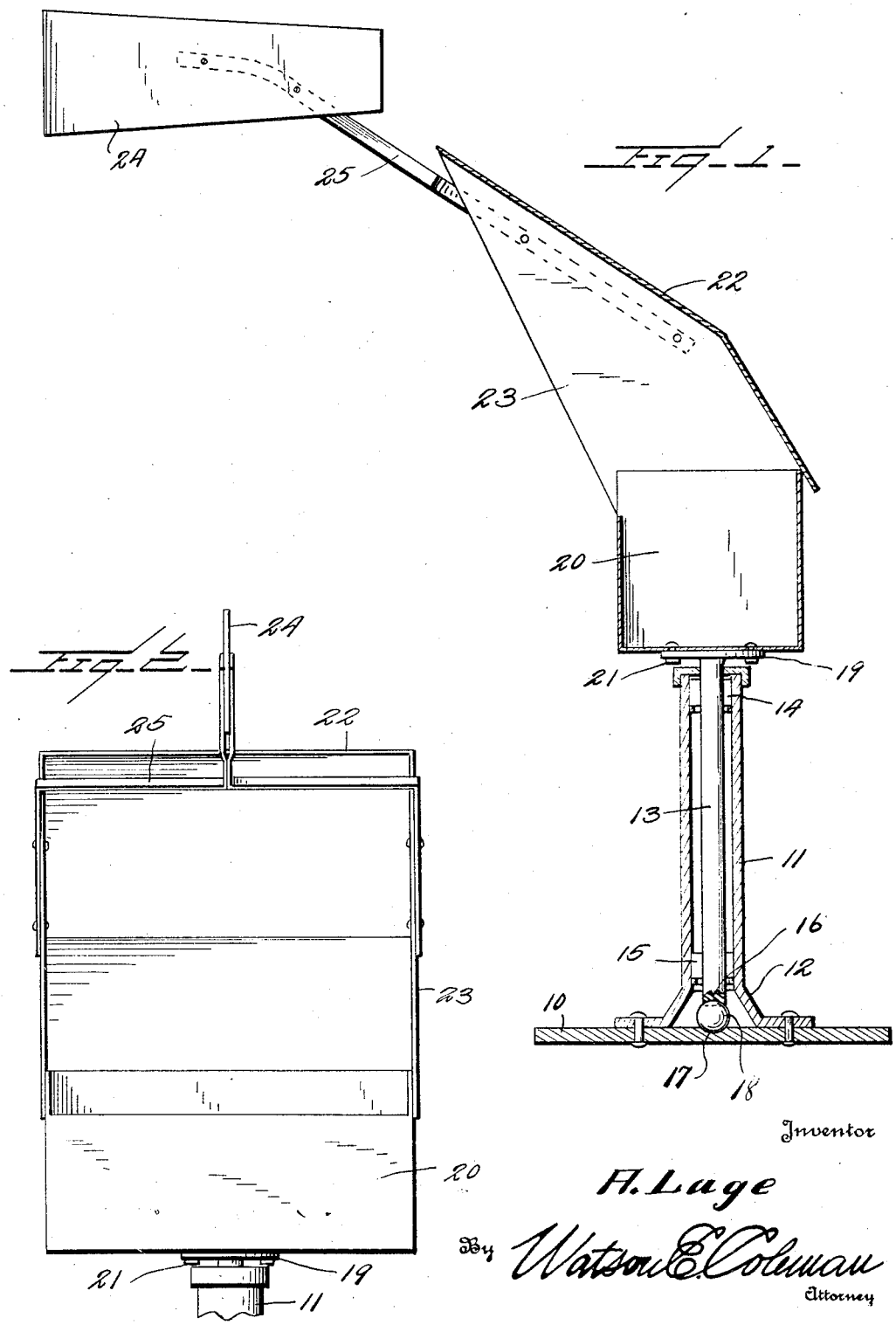
Inventor
A. Lage
By Watson E. Coleman
Attorney Patented Mar. 17, 1931

1,796,466

UNITED STATES PATENT OFFICE

ARTHUR LAGE, OF CARROLL, NEBRASKA

FEEDING RECEPTACLE

Application filed February 8, 1930. Serial No. 426,943.

The present invention relates to salt receptacles and more particularly to a salt receptacle adapted for use in feeding salt to animals or the like.

An object of this invention is to provide a receptacle which may be positioned in any convenient location where access may readily be had thereto by the animals and which is so constructed that the contents of the receptacle will not be affected by rain or the like and at the same time permit the animals to readily lick the salt.

Another object of this invention is to provide a receptacle of this character which is adapted to be positioned upon a standard, the receptacle being rotatably carried by the standard and at the same time being so constructed as not to be readily or easily knocked over by the animals.

A further object of this invention is to provide a salt receptacle which may be easily and readily manufactured and may be constructed of any desired material and is so constructed as to prevent the animals from wasting the salt.

The above and various other objects and advantages of this invention will in part be described in and in part be understood from the following detailed description of the present preferred embodiment, the same being illustrated in the accompanying drawing wherein:—

Figure 1 is a longitudinal sectional view partly in detail of a device constructed according to the preferred embodiment of this invention; and Figure 2 is a fragmentary front elevation of the device.

Referring to the drawing wherein like numerals of reference designate corresponding parts throughout the several views, the numeral 10 designates a base upon which is mounted in upstanding position a standard 11. The standard 11 is of hollow or tubular construction and provided at the lower end portion thereof with a flaring portion 12 which is bolted or otherwise secured to the base 10.

A rotatable shaft 13 is positioned within the housing 11 and is held in rotatable position by an upper anti-friction bearing 14 and a lower anti-friction bearing 15 which are mounted within the standard 11 in spaced relation to each other and are adapted to maintain the shaft in spaced relation to the inner periphery of the housing 11. The shaft 13 is provided at the lower end portion thereof with a concave portion 16, and the base 10 is provided with a complementary concave portion 17 for rotatably receiving a spherical anti-friction bearing member 18 so that the shaft 13 may freely rotate within the standard 11. The shaft 13 is also provided at the upper end portion thereof with a plate member 19 which is secured to the upper end of the shaft 13 in any desired manner as by welding, riveting or the like, and the plate is adapted to be positioned in substantially parallel relation to the base 10.

A salt receiving member 20 of suitable size and configuration is mounted on the plate member 19 being secured thereto by a plurality of bolts 21 or the like. The receptacle 20 is preferably of substantially rectangular configuration but I do not wish to be limited to the particular configuration herein disclosed for the receptacle 20 inasmuch as any other desired configuration may be used without departing from the spirit of the invention. The receptacle 20 is provided with a roof or top portion 22 which is angularly inclined from one edge portion of the receptacle, the upper end portion of the top 22 being free so as to permit the animals to project their heads into the receptacle so as to obtain the salt or any other food which may be placed within the receptacle 20.

The top or roof member 22 is provided with a pair of side members 23 which, if desired, may be formed integrally with the top or be bolted or otherwise secured thereto along one edge of the roof. The lower edge portion of the sides 23 may be secured to the upper edge portion of the opposite ends of the receptacle 20 or if desired may be left in free position but extending downwardly over the upper edge of the ends so as to provide a substantial hood for the open top of the receptacle.

A weather vane 24 of suitable configuration is secured to the hood member 22 and is held in spaced relation to the hood by an elongated bar or securing member 25. The weather vane 24 is positioned in substantially vertical position and is of sufficient size so that when the wind strikes the weather vane, the receptacle 20 will be swung about the standard 11 so that the open portion of the receptacle will be protected from any rain or moisture which may be falling and which would otherwise damage or render unfit for use the food or salt which may be contained in the receptacle.

In the use of this device, the base 10 may be positioned in any desired location but preferably in a location convenient to any animals and, if desired, may be anchored or otherwise secured to the ground or floor of a building so that any animals brushing against the receptacle 20 or eating the food contained in the receptacle will not tip the device over. The desired food may be placed in the receptacle and preferably salt is positioned therein, and when a wind with accompanying rain is encountered, the wind will swing the weather vane 24 and coactively swing the hood 22 and receptacle 20 so that the hood will protect the contents of the receptacle from moisture or the like. It will therefore be obvious that a thoroughly protected feeding box has been provided which may be positioned in a pasture or the like and which may be permanently located in the desired position, the contents of the receptacle being at all times thoroughly and adequately protected from the weather.

While the foregoing description refers to the device as a salt receptacle, it is, of course, to be understood that the invention is not limited to use in feeding salt to live stock, but is also applicable for feeding mineral foods or grain.

It will also be understood that various changes and modifications may be made in the details of construction and design of the above specifically described embodiment of the invention without departing from the spirit thereof, such changes and modifications being restricted only by the scope of the following claims.

What is claimed is:—

1. A feeding receptacle of the character described comprising a box having an open top, a base, a vertically disposed standard secured to said base, a shaft rotatably mounted in said standard, anti-friction means interposed between one end of said shaft and said base, means for securing said box to said shaft, an angularly inclined hood secured to said box, and a weather vane fixedly secured to said hood whereby to swing the box upon the standard.

2. A receptacle of the character described comprising a base, a standard upstanding from the base, a shaft, anti-friction bearing means carried by said standard and engaging said shaft, a feeding box, means for securing said feeding box to said shaft, a protecting hood secured to said box, and an outstanding weather vane secured to said hood and adapted to swing the hood and receptacle upon the standard.

3. A receptacle of the character described comprising a base, a standard upstanding from the base, a shaft rotatably mounted in the standard, said shaft having a concave lower end portion, said base having a concave portion in alignment with said shaft, a spherical thrust member seating in said concave portion of said base and engaging the lower end of said shaft whereby to facilitate rotation of the shaft in the standard, a feeding receptacle secured to said shaft in the upper end portion thereof, means for securing said receptacle to said shaft, a protecting hood for said receptacle, and means for swinging said receptacle upon the base.

In testimony whereof I hereunto affix my signature.

ARTHUR LAGE.